United States Patent
Adachi et al.

(10) Patent No.: US 12,128,564 B2
(45) Date of Patent: Oct. 29, 2024

(54) CONTROL METHOD FOR ROBOT AND ROBOT SYSTEM

(71) Applicant: SEIKO EPSON CORPORATION, Tokyo (JP)

(72) Inventors: Hiroki Adachi, Matsumoto (JP); Kaoru Takeuchi, Azumino (JP); Hirofumi Kinoshita, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 217 days.

(21) Appl. No.: 17/203,773

(22) Filed: Mar. 17, 2021

(65) Prior Publication Data
US 2021/0291365 A1    Sep. 23, 2021

(30) Foreign Application Priority Data
Mar. 18, 2020  (JP) ................................. 2020-047310

(51) Int. Cl.
*B25J 9/16*  (2006.01)

(52) U.S. Cl.
CPC .............. *B25J 9/1633* (2013.01); *B25J 9/163* (2013.01)

(58) Field of Classification Search
CPC ........ B25J 9/1633; B25J 9/163; B25J 9/1602; B25J 9/1664; B25J 9/1694
See application file for complete search history.

(56) References Cited

U.S. PATENT DOCUMENTS

| | | | |
|---|---|---|---|
| 2015/0081098 A1* | 3/2015 | Kogan | B25J 13/085 901/46 |
| 2016/0288332 A1* | 10/2016 | Motoyoshi | B25J 13/085 |
| 2017/0266815 A1 | 9/2017 | Takeuchi | |
| 2018/0200880 A1* | 7/2018 | Meissner | G05B 19/423 |
| 2018/0345492 A1 | 12/2018 | Watanabe et al. | |
| 2019/0217480 A1* | 7/2019 | Park | B25J 13/00 |
| 2019/0366549 A1 | 12/2019 | Adachi | |

FOREIGN PATENT DOCUMENTS

| | | | | |
|---|---|---|---|---|
| EP | 2131257 A1 * | 12/2009 | | G05B 19/423 |
| JP | 2012157946 A | 8/2012 | | |
| JP | 2017074669 A | 4/2017 | | |
| JP | 2017094440 A | 6/2017 | | |
| JP | 2017164876 A | 9/2017 | | |
| JP | 2019209386 A | 12/2019 | | |

\* cited by examiner

*Primary Examiner* — Abby Y Lin
*Assistant Examiner* — Danielle M Jackson
(74) *Attorney, Agent, or Firm* — Samson G. Yu

(57) ABSTRACT

In a control method for a robot including a manipulator and a force detector that detects an external force acting on the manipulator on three detection axes orthogonal to one another, a direction of the external force is detected by the force detector, and a degree of freedom of motion of a tool center point set for the manipulator according to the external force is limited based on the direction of the external force.

3 Claims, 11 Drawing Sheets

CONTROL METHOD FOR ROBOT AND ROBOT SYSTEM

The present application is based on, and claims priority from JP Application Serial Number 2020-047310, filed Mar. 18, 2020, the disclosure of which is hereby incorporated by reference herein in its entirety.

BACKGROUND

1. Technical Field

The present disclosure relates to a control method for a robot and a robot system.

2. Related Art

In related art, as shown in JP-A-2012-157946, in direct teaching in which a worker teaches by directly applying a force to a robot, a technique of switching between settings of moving methods of translationally moving and rotationally moving the robot is known.

However, in the direct teaching disclosed in JP-A-2012-157946, there is a problem that work is complex because an operation on an operation part such as a switch is necessary for switching between the settings of the moving methods.

SUMMARY

An aspect is directed to a control method for a robot including a manipulator and a force detector that detects an external force acting on the manipulator on three detection axes orthogonal to one another, the method including detecting a direction of the external force by the force detector, and limiting motion of a tool center point set for the manipulator according to the external force to one degree of freedom based on the direction of the external force.

Another aspect is directed to a control method for a robot including a manipulator and a force detector that detects an external force acting on the manipulator using three detection axes orthogonal to one another, the method including detecting a direction of the external force by the force detector, and limiting motion of a tool center point set for the manipulator according to the external force to two degrees of freedom based on the direction of the external force.

Another aspect is directed to a robot system including a robot including a manipulator and a force detector that detects an external force acting on the manipulator on three detection axes orthogonal to one another, and a control apparatus that detects a direction of the external force by the force detector, and limits motion of a tool center point set for the manipulator according to the external force to one degree of freedom based on the direction of the external force.

Another aspect is directed to a robot system including a robot including a manipulator and a force detector that detects an external force acting on the manipulator using three detection axes orthogonal to one another, and a control apparatus that detects a direction of the external force by the force detector, and limits motion of a tool center point set for the manipulator according to the external force to two degrees of freedom based on the direction of the external force.

DESCRIPTION OF EXEMPLARY EMBODIMENTS

Figure 1:
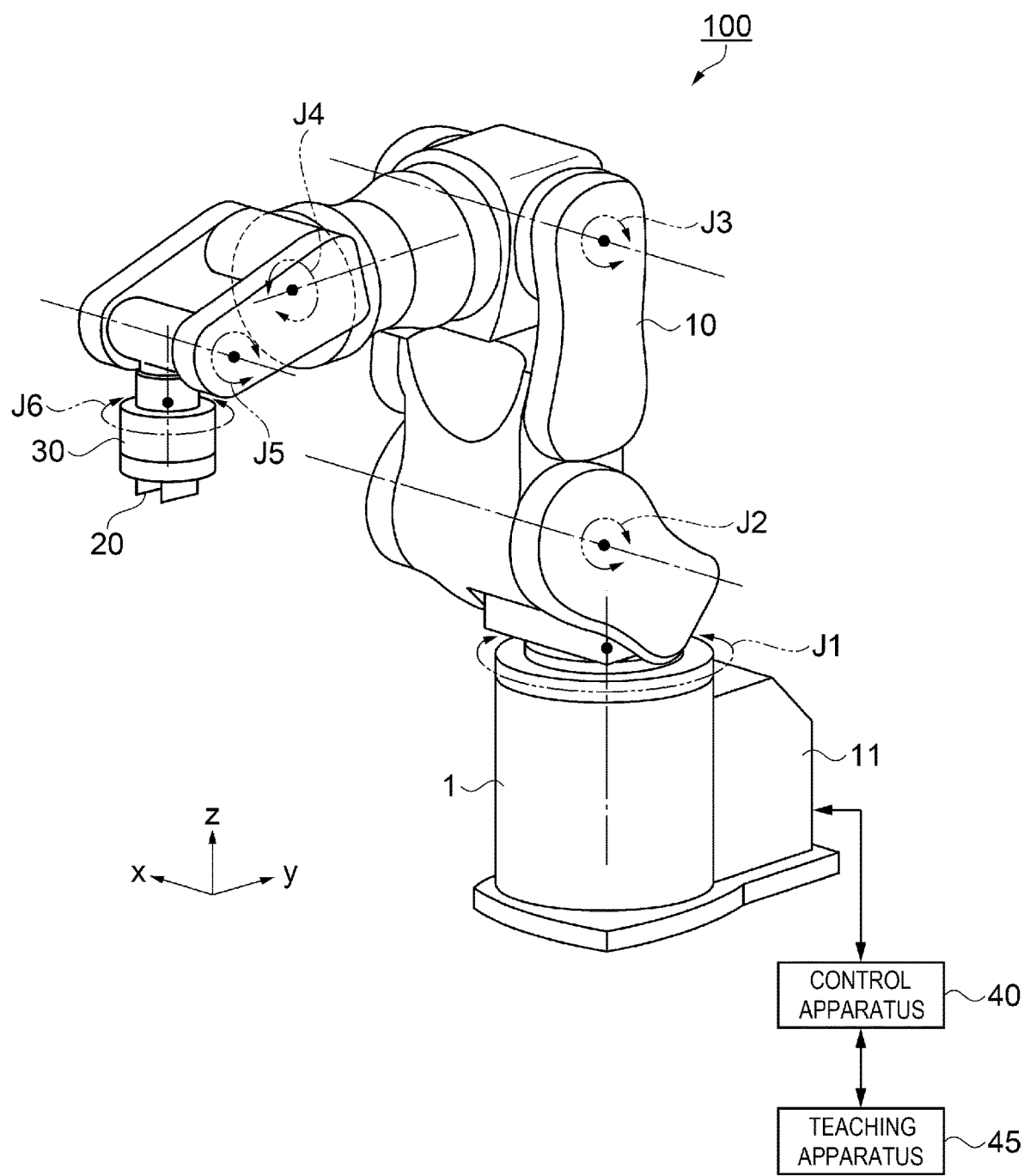
FIG. 1 is a perspective view for explanation of a schematic configuration of a robot system.

As below, embodiments will be explained with reference to the drawings. In the drawings, the same or similar elements respectively have the same or similar signs and the overlapping explanation will be omitted.

As shown in FIG. 1, a robot system 100 according to the embodiment includes e.g. a robot 1, a control apparatus 40, and a teaching apparatus 45. The robot 1 includes a manipulator 10, a base 11 supporting the manipulator 10, an end effector 20, and a force detector 30. As the robot 1, e.g. a general-purpose robot that can perform various kinds of work by teaching of the teaching apparatus 45 may be employed.

The manipulator 10 is a robotic arm having e.g. pluralities of mutually coupled links and joints and moving at a plurality of degrees of freedom. In the example shown in FIG. 1, the manipulator 10 is a six-axis arm having six joints J1 to J6. In the example shown in FIG. 1, the joints J2, J3, J5 are bending joints and the joints J1, J4, J6 are twisting joints. The end effector 20 is a tool such as e.g. a screw driver, gripper, or grinder. The end effector 20 performs various kinds of work including e.g. screwing, gripping, and machining. The end effector 20 is attached to the joint J6 via a mechanical interface in the distal end portion of the manipulator 10. The manipulator 10 is driven by the control apparatus 40, and thereby, determines a position and a posture of the end effector 20.

For the manipulator 10, a tool center point (TCP) as a reference for the position of the end effector 20 is set in a predetermined position near the distal end, for example. The TCP can be arbitrarily set and, for example, is set on a rotation axis of the joint J6. When a gripper is used as the end effector 20, the center of the gripper can be set as the TCP. Note that, in the embodiment, the manipulator 10 has six degrees of freedom as an example. The manipulator 10 may have any joint mechanism as long as the robot can realize motion of the TCP at three or more degrees of freedom. The base 11 positions the first link of the manipulator 10, i.e., the single link closest to the base 11.

The force detector 30 is a force sensor that detects an external force acting on the manipulator 10 on three detection axes orthogonal to one another via e.g. the end effector 20. More specifically, the force detector 30 measures forces along the three detection axes and torque around the three detection axes acting on the TCP in a force detector coordinate system as an intrinsic three-dimensional orthogonal coordinate system. In the example shown in FIG. 1, the force detector 30 is attached to the distal end of the manipulator 10, however, may be attached to another location of the robot 1.

Figure 2:
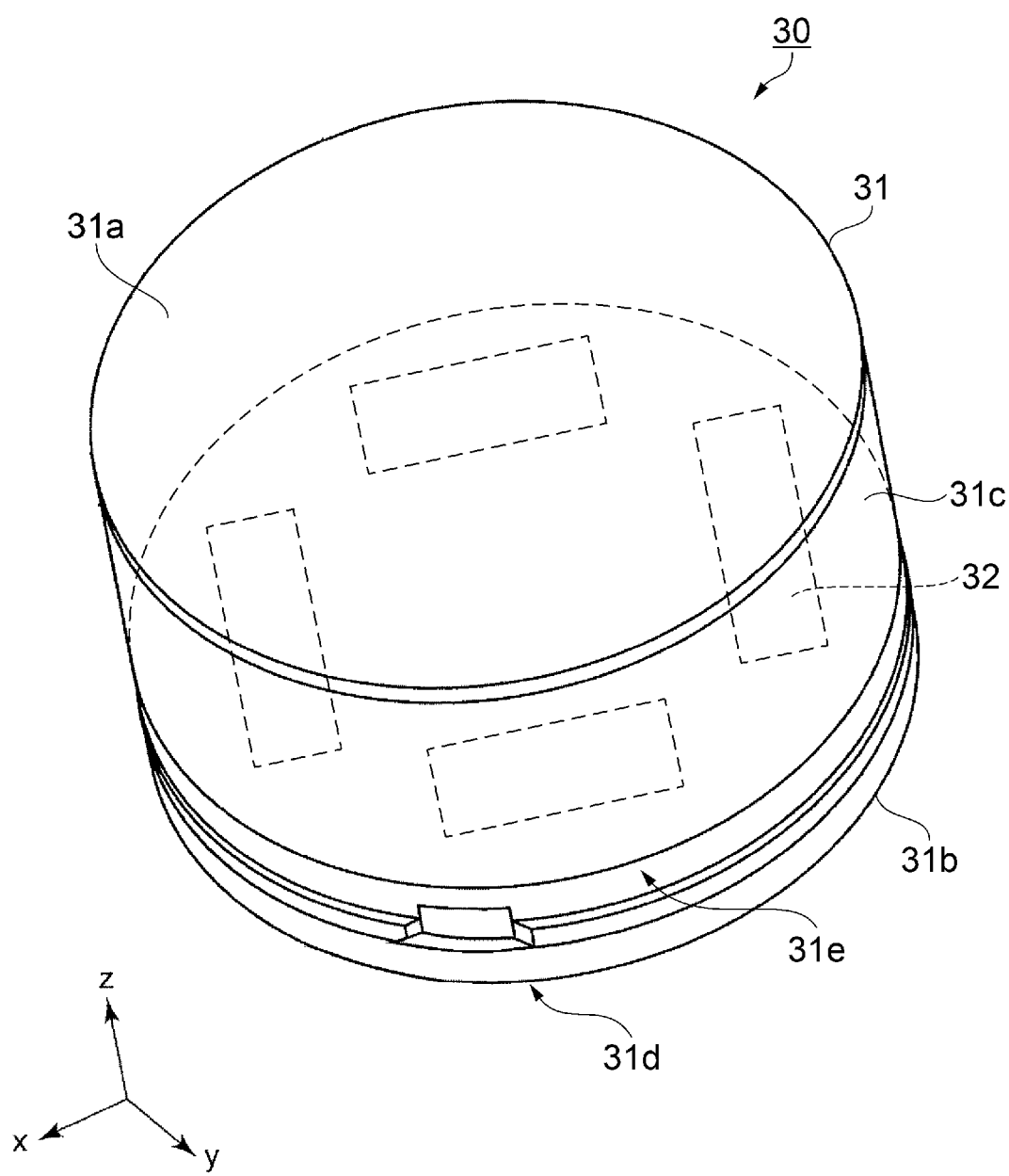
FIG. 2 is a diagram for explanation of an example of a device that detects a force.

As shown in FIG. 2, the force detector 30 has a case 31, a substrate housing member 31e coupled to the case 31, a coupling member 31d coupled to the substrate housing member 31e, and one or more sensor devices 32 housed within the case 31. The case 31 has a circular columnar shape formed by e.g. a circular first attachment surface 31a as a top surface, a circular second attachment surface 31b as a bottom surface, and a cylindrical side wall portion 31c coupling the top surface and the bottom surface. These may take an integrated structure. For example, the second attachment surface 31b is attached to the distal end of the manipulator 10 and the end effector 20 is attached to the first attachment surface 31a. The shape of the force sensor is not limited, but may be a rectangular parallelepiped shape or a polygonal columnar shape.

Constituent materials of the first attachment surface 31a, the second attachment surface 31b, the cylindrical side wall portion 31c, and the coupling member 31d are not particularly limited to, but include e.g. metal materials such as aluminum and stainless steel and ceramics. Further, all of these may be formed using the same or same kind of material or using different materials from one another.

The sensor device 32 detects translational force components in directions along the respective three detection axes of an x-axis, a y-axis, and a z-axis and moment (torque) of forces around the three detection axes using one or more elements. The sensor device 32 is of e.g. a quartz crystal piezoelectric type. The quartz crystal piezoelectric type is employed, and thereby, the force detector 30 having good properties in high sensitivity, wide dynamic range, high rigidity, etc. is realized.

The xyz coordinate system shown in FIG. 1 is a world coordinate system set with respect to the floor surface on which the robot 1 is placed. The world coordinate system is a three-dimensional orthogonal coordinate system defined by an x-axis and a y-axis orthogonal to each other along a horizontal plane and a z-axis in a vertically upward direction as a positive direction. The negative direction on the z-axis substantially coincides with the direction of the gravity force. The rotation angle about the x-axis is expressed by Rx, the rotation angle about the y-axis is expressed by Ry, and the rotation angle about the z-axis is expressed by Rz. An arbitrary position in the three-dimensional space may be expressed by coordinates on the x, y, z-axes and an arbitrary posture in the three-dimensional space may be expressed by the rotation angles Rx, Ry, Rz. Positions and postures of the end effector 20, the manipulator 10, the base 11, etc. may be defined in the world coordinate system. Hereinafter, "position" may refer to a pose, i.e., a position and a posture. Similarly, hereinafter, "force" may refer to a load, i.e., a force and torque. The control apparatus 40 controls the position of the TCP in the world coordinate system by driving the manipulator 10.

The control apparatus 40 detects a direction of an external force acting on the manipulator 10 using e.g. the force detector 30, and limits the motion of the TCP according to the external force to one degree of freedom based on the direction of the external force. For example, when an external force along the x-axis of the world coordinate system acts on the TCP by a human, the control apparatus 40 controls the manipulator 10 to move the TCP along only the x-axis of the world coordinate system.

The control apparatus 40 may limit the motion of the TCP according to the external force to two degrees of freedom based on the direction of the external force. For example, when an external force along an x-y plane parallel to the x-axis and the y-axis of the world coordinate system acts on the TCP by a human, the control apparatus 40 controls the manipulator 10 to move the TCP along the x-y plane. Or, the control apparatus 40 may control the manipulator 10 to change only the posture, but not to change the position of the TCP.

Figure 3:
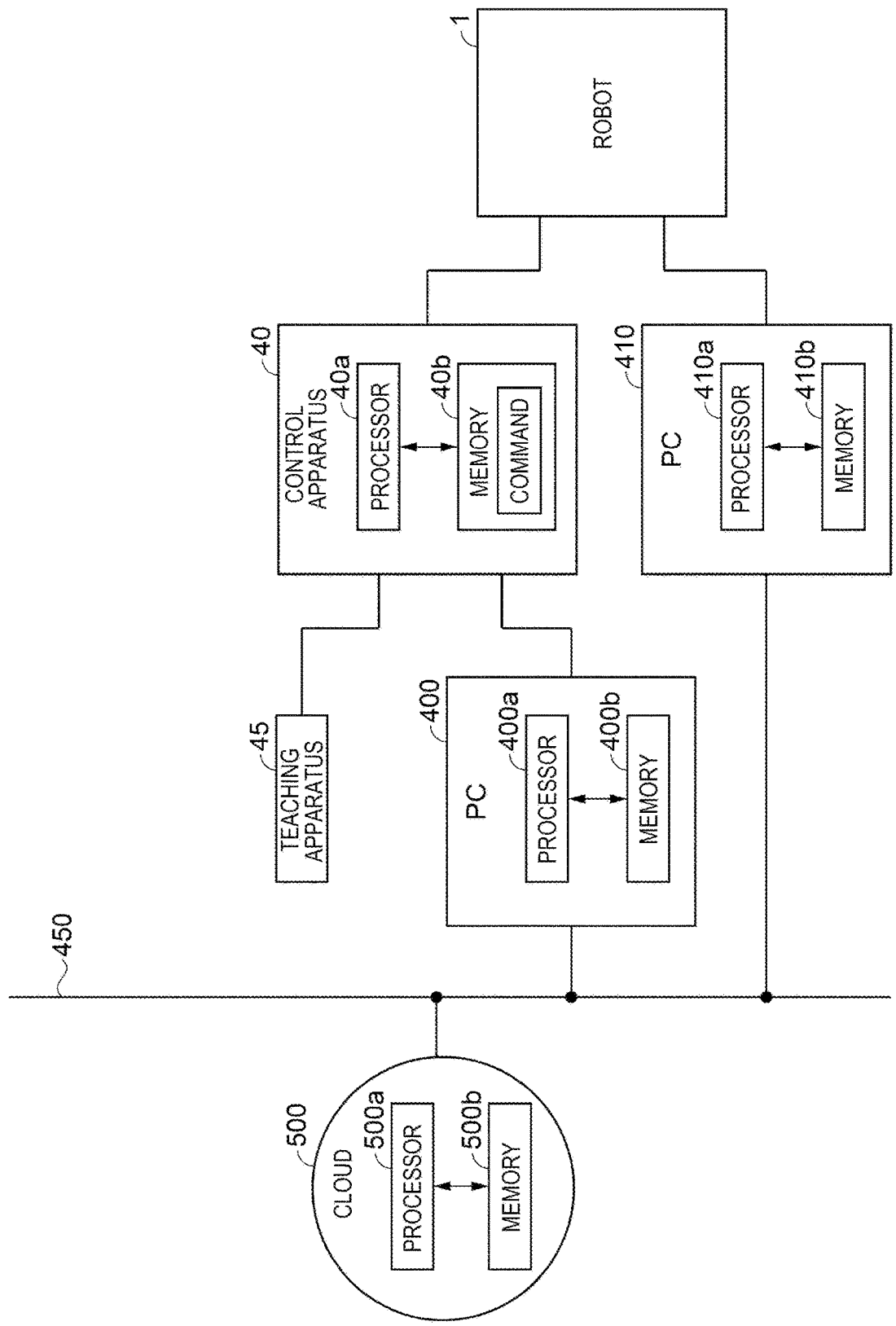
FIG. 3 is a block diagram for explanation of an example of a control apparatus.

As shown in FIG. 3, the control apparatus 40 includes a processor 40a and a memory 40b forming a computer system. The control apparatus 40 can be formed by e.g. a general-purpose computer. The processor 40a controls the robot 1 by executing a command according to a control program. The processor 40a has a processing circuit such as e.g. a central processing unit (CPU). The memory 40b is a computer-readable storage medium that stores programs and various kinds of data necessary for the control of the robot 1. The memory 40b is e.g. a random access memory (RAM), a read only memory (ROM), or the like. Part or all of the component elements of the control apparatus 40 may be placed inside of the housing of the robot 1.

As shown in FIG. 1, the control apparatus 40 respectively communicates with the robot 1 and the teaching apparatus 45 via communication links. The communication links may be wired or wireless or combinations of wired and wireless connections. The control apparatus 40 may control the end effector 20. For example, when the end effector 20 is a gripper, the control apparatus 40 may grip an object by driving the end effector 20. Further, the control apparatus 40 acquires a force applied to the TCP based on the value acquired by the force detector 30.

The control apparatus 40 may include a plurality of processors. That is, in the example shown in FIG. 3, the control apparatus 40 can configure a control apparatus that controls the robot 1 with personal computers (PCs) 400, 410 connected to the control apparatus 40 via a network 450 and a cloud 500 as a service server. The PC 400 includes a processor 400a and a memory 400b and the PC 410 includes a processor 410a and a memory 410b. The cloud 500 includes a processor 500a and a memory 500b. The control apparatus 40 may realize a control apparatus that controls the robot 1 using hardware resources of the other devices including the processors 400a, 410a, 500a and the memories 400b, 410b, 500b.

The teaching apparatus 45 is a computer that teaches programs to the robot 1 via the control apparatus 40. The teaching apparatus 45 may be a dedicated computer such as a teaching pendant or a general-purpose computer in which programs for teaching the robot 1 are installed. The teaching apparatus 45 may include a housing separate from that of the control apparatus 40 or share a hardware resource with the control apparatus 40.

Figure 4:
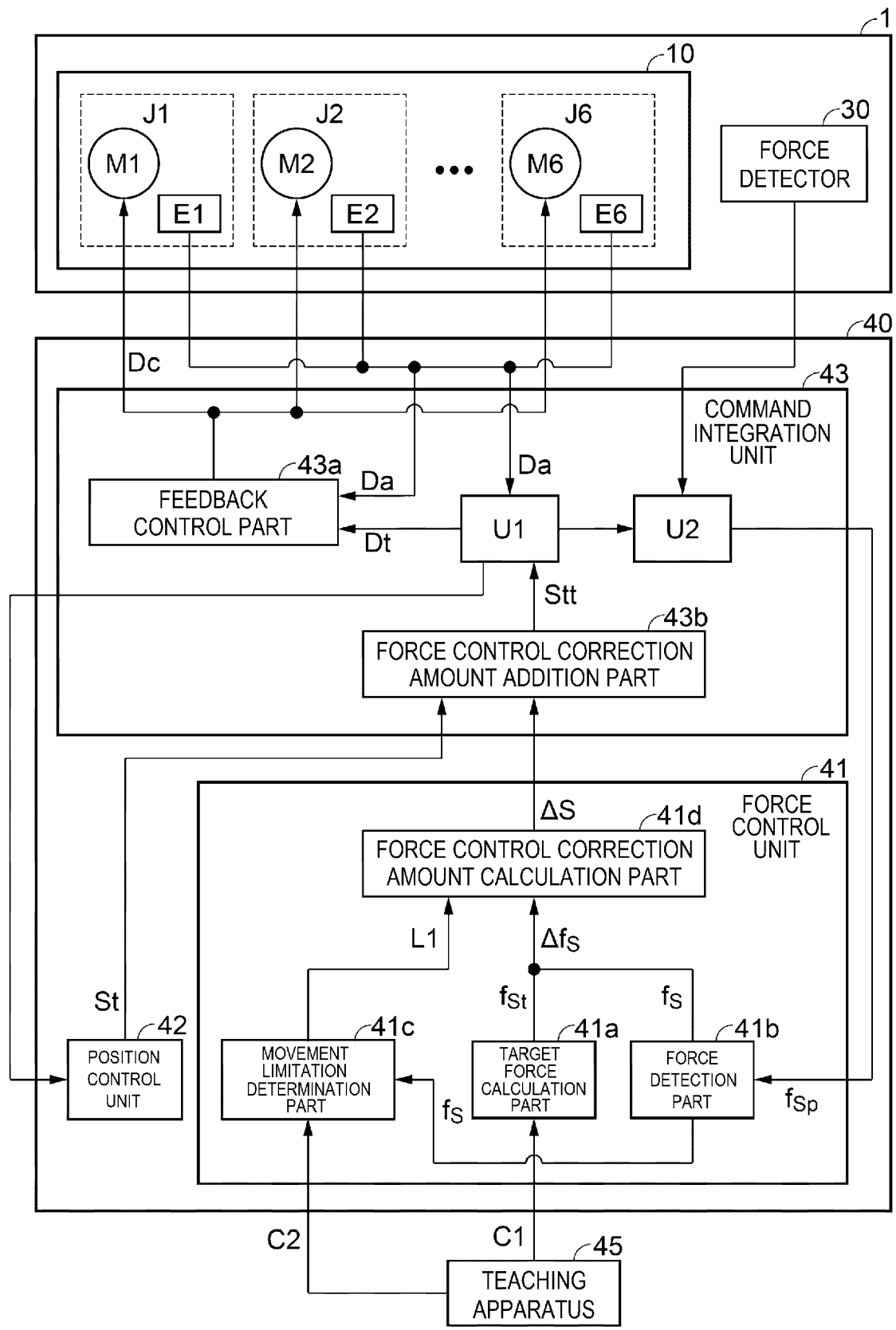
FIG. 4 is a functional block diagram for explanation of the control apparatus.

As shown in FIG. 4, the joints J1 to J6 of the manipulator 10 have motors M1 to M6 as actuators and encoders E1 to E6 as angle sensors, respectively. The motors M1 to M6 are respectively driven under the control by the control apparatus 40 and rotate the joints J1 to J6, respectively. The encoders E1 to E6 detect the rotation angles of the motors M1 to M6 and output the angles to the control apparatus 40.

As shown in FIG. 4, the control apparatus 40 has a force control unit 41, a position control unit 42, and a command integration unit 43 as a logical structure. The force control unit 41, the position control unit 42, and the command integration unit 43 are realized by the control apparatus 40 executing a preinstalled control program. The force control unit 41, the position control unit 42, and the command integration unit 43 may be respectively formed by pluralities of processing circuits or formed by an integrated processing circuit to one another.

The control apparatus 40 has a first conversion unit U1 that bi-directionally converts between a combination of the respective rotation angles of the motors M1 to M6 and a position of the TCP in the world coordinate system based on a prestored correspondence relationship. For example, the first conversion unit U1 converts a position S in the world coordinate system into respective rotation angles Da of the motors M1 to M6. The position S may represent a position and a posture on the six axes (x, y, z, Rx, Ry, Rz) defining the world coordinate system. The control signals output by the control apparatus 40 to the motors M1 to M6 are e.g. pulse-width modulated (PWM) signals.

The control apparatus 40 has a second conversion unit U2 that converts a signal detected by the force detector 30 into a force $f_{Sp}$ in the world coordinate system based on the correspondence relationship showing the posture of the sensor coordinate system with respect to each position S of the TCP in the world coordinate system. The second conversion unit U2 may calculate a torque component of the force $f_{Sp}$ from a force component of the force $f_{Sp}$ and a distance from the TCP to the force detector 30.

The force control unit 41 has a target force calculation part 41a, a force detection part 41b, a movement limitation determination part 41c, and a force control correction amount calculation part 41d as a logical structure. The force control unit 41 has a function for controlling an external force $f_S$ acting on the TCP to be a predetermined target force $f_{St}$. Specifically, the force control unit 41 calculates a force control correction amount ΔS for correction of the target position to set the external force $f_S$ to the target force $f_{St}$ along a movement limitation command L1 and outputs the amount to the command integration unit 43.

The target force calculation part 41a calculates the target force $f_{St}$ based on e.g. a command C1 stored by the control apparatus 40 according to the teaching by the teaching apparatus 45. In a case of direct teaching, the target force calculation part 41a calculates the target force $f_{St}$ for execution of profile control to set the force applied to the TCP of the manipulator 10 to zero so that the worker may grip the end effector 20 attached to the distal end of the manipulator 10 and apply a force to the end effector 20.

The force detection part 41b acquires the external force $f_S$ acting on the TCP on the three detection axes orthogonal to one another by the force detector 30. Specifically, the force detection part 41b detects the external force $f_S$ acting on the TCP without an influence of the gravity force by providing gravity compensation to remove a component due to the gravity force to the force $f_{Sp}$ acquired from the force detector 30 via the second conversion unit U2. The three detection axes of the force detection part 41b can be converted to the three detection axes of the force detector 30 to each other via the second conversion unit U2. That is, the external force $f_S$ acting on the TCP with reference to the detection axes of the force detector 30 and the external force $f_S$ acting on the TCP with reference to the detection axes of the force detection part 41b may be treated the same as each other. The force detection part 41b can designate any coordinate system of the world coordinate system, the tool coordinate system, the local coordinate system, etc. as the detection axes of the force detector 30.

The movement limitation determination part 41c limits the degree of freedom of the motion according to the external force $f_S$ on the distal end of the manipulator 10 based on the direction of the external force $f_S$ detected by the force detection part 41b. In the embodiment, the distal end of the manipulator 10 strictly refers to the TCP. The movement limitation determination part 41c generates the movement limitation command L1 for limiting the motion of the TCP according to the external force $f_S$ to one degree of freedom when the external force $f_S$ satisfies a first condition. The first condition is a condition for determination as to whether or not the motion of the TCP according to the external force $f_S$ has one degree of freedom.

Figure 5:
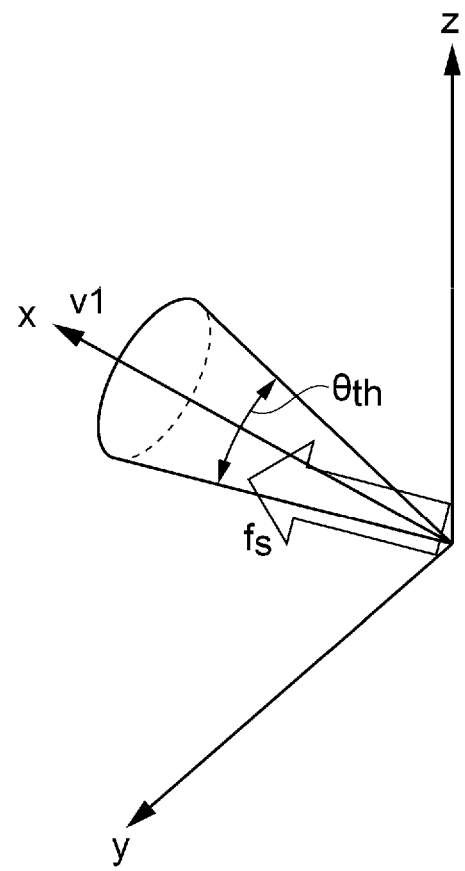
FIG. 5 is a diagram for explanation of an example of determination of one-degree-of-freedom limitation using a vector.

For example, as shown in FIG. 5, the first condition is that an angle formed by a directional vector of the external force $f_S$ and the detection axis having the maximum component of the external force $f_S$ of the three detection axes of the force detector 30 is smaller than a first value $\theta_{th}$. As below, a case where the world coordinate system is designated as the coordinate system as reference of motion by a command C2 stored by the control apparatus 40 according to teaching by the teaching apparatus 45. In the example shown in FIG. 5, the detection axis having the maximum external force $f_S$ component in the world coordinate system is the x-axis and a unit vector of the x-axis is a vector v1. The movement limitation determination part 41c limits the motion direction of the TCP according to the external force $f_S$ to only the x-axis direction of the world coordinate system when an angle formed by the external force $f_S$ and the x-axis is smaller than the first value $\theta_{th}$. For example, the first value $\theta_{th}$ may be set to an arbitrary value from 0 [deg] to 180 [deg] using the teaching apparatus 45. As the coordinate system designated by the command C2, the tool coordinate system or the local coordinate system can be employed.

Figure 6:
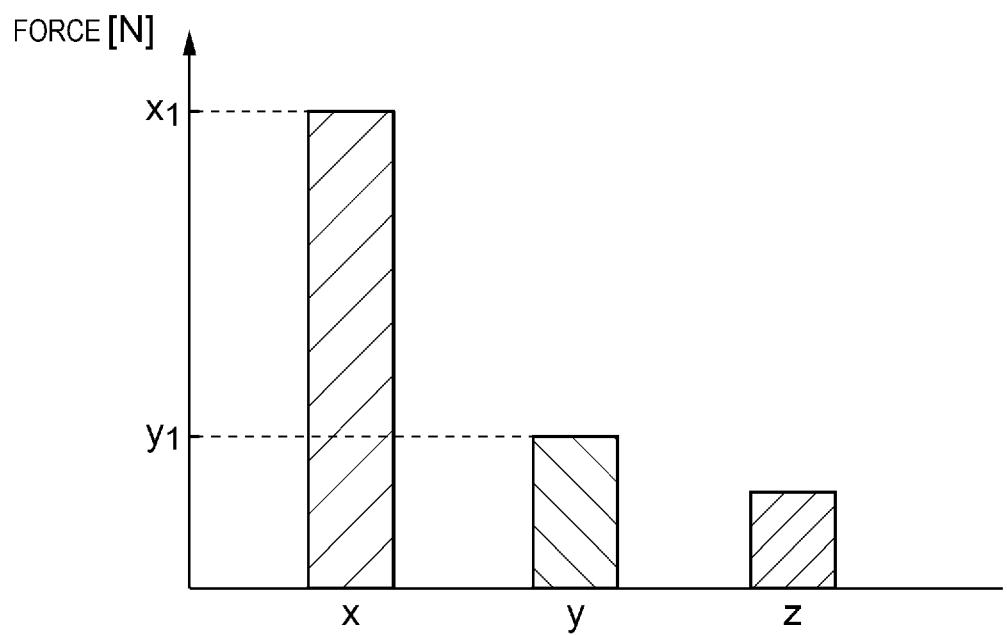
FIG. 6 is a diagram for explanation of an example of determination of one-degree-of-freedom limitation using a ratio of force components.

Or, as shown in FIG. 6, as the first condition, a condition that the largest value of the magnitude of the respective components of the external force $f_S$ on the three detection axes of the force detector 30 is larger than a product of the second largest value and a first constant $k_1$ may be employed. In this case, a calculation using vectors is unnecessary. The movement limitation determination part 41c may limit the degree of freedom of the motion of the TCP according to the external force $f_S$ based on a distribution of the magnitude of the respective components of the external force $f_S$ on the three detection axes of the force detector 30. In the example shown in FIG. 6, the largest value of the respective components of the external force $f_S$ is $x_1$ [N] and the second largest value is $y_1$ [N]. In this case, the movement limitation determination part 41c limits the motion direction of the TCP according to the external force $f_S$ to the x-axis direction when the external force $f_S$ satisfies $(x_1/y_1) > k_1$.

Further, the movement limitation determination part 41c may generate the movement limitation command L1 for limiting the motion of the TCP according to the external force $f_S$ to two degrees of freedom when the external force $f_S$ satisfies a second condition. The second condition is a condition for determination as to whether or not the motion of the TCP according to the external force $f_S$ has two degrees of freedom.

Figure 7:
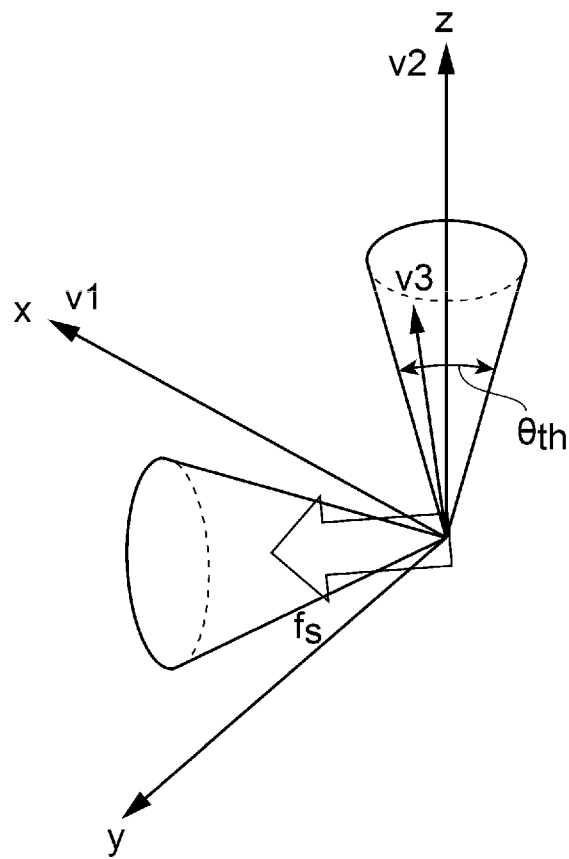
FIG. 7 is a diagram for explanation of an example of determination of two-degree-of-freedom limitation using vectors.

For example, as shown in FIG. 7, the second condition is that an angle formed by an outer product of the directional vector of the external force $f_S$ and a unit vector of the detection axis having the maximum component of the external force $f_S$ of the three detection axes of the force detector 30 and a unit vector of the detection axis having the minimum component of the external force $f_S$ of the three detection axes is smaller than a second value $\theta_{th}$. In the example shown in FIG. 7, the detection axis having the maximum external force $f_S$ component in the world coordinate system is the x-axis and the unit vector of the x-axis is the vector v1. Similarly, the detection axis having the minimum external force $f_S$ component is the z-axis and a unit vector of the z-axis is a vector v2. When the outer product of the directional vector of the external force $f_S$ and the vector v1 is a vector v3, the movement limitation determination part 41c limits the motion direction of the TCP according to the external force $f_S$ to a direction along the x-y plane of the world coordinate system when an angle formed by the vector v3 and the vector v2 is smaller than the second value $\theta_{th}$. For example, the second value $\theta_{th}$ may be set to an arbitrary value from 0 [deg] to 180 [deg] using the teaching apparatus 45. The second value $\theta_{th}$ may be the same value as the first value $\theta_{th}$ or a different value.

Figure 8:
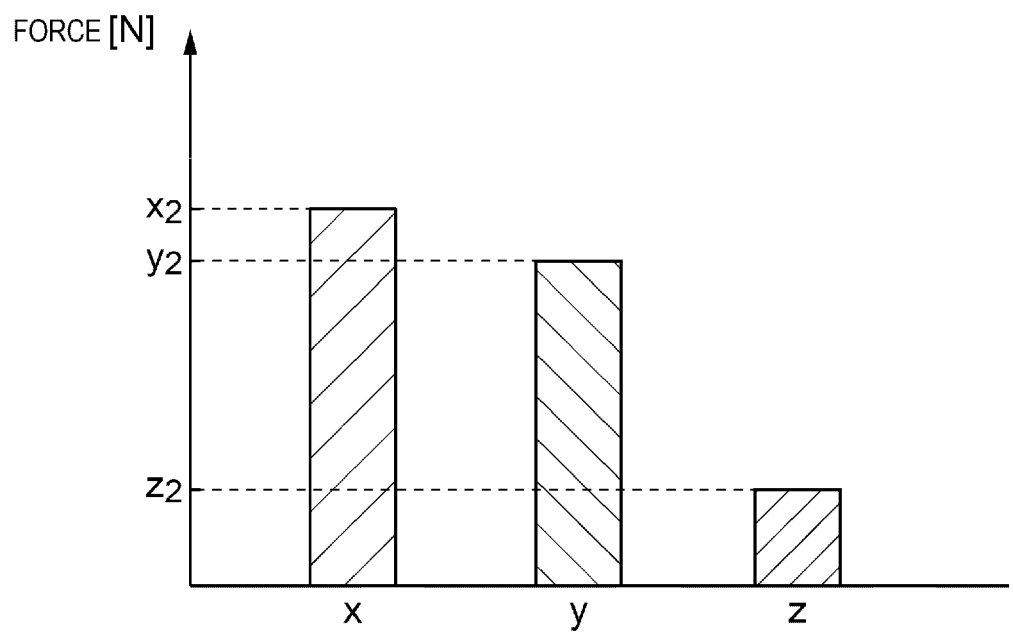
FIG. 8 is a diagram for explanation of an example of determination of two-degree-of-freedom limitation using a ratio of force components.

Or, as shown in FIG. 8, as the second condition, a condition that the largest value of the magnitude of the respective components of the external force $f_S$ on the three detection axes of the force detector 30 is smaller than a product of the second largest value and a second constant $k_2$ and the second largest value is larger than a product of the smallest value and a third constant $k_3$ may be employed. In this case, a calculation using vectors is unnecessary. In the example shown in FIG. 8, the largest value of the respective components of the external force $f_S$ is $x_2$ [N], the second largest value is $y_2$ [N], and the smallest value is $z_2$ [N]. In this case, the movement limitation determination part 41c limits the motion direction of the TCP according to the external force $f_S$ to the direction along the x-y plane when the external force $f_S$ satisfies $(x_2/y_2)$ c $k_2$ and $(y_2/z_2) > k_3$ at the same time.

Other motion of the TCP limited to one degree of freedom by the movement limitation command L1 includes translational motion in the directions along the respective axes of y, z and rotational motion around the respective axes of x, y, z. Other motion of the TCP limited to two degrees of freedom by the movement limitation command L1 includes motion along the y-z plane and motion along the x-z plane. In addition, the motion of the TCP limited by the movement limitation command L1 includes motion to change only the posture, motion to freely change the position and the posture, etc. The limitation of the motion of the TCP is changed by a combination of the command C2 and the movement limitation command L1.

The movement limitation determination part 41c generates and outputs the movement limitation command L1 when the external force $f_S$ detected by the force detection part 41b is larger than a predetermined threshold value. The movement limitation determination part 41c continues output of the same movement limitation command L1 until the external force $f_S$ is equal to or smaller than the threshold value.

The force control correction amount calculation part 41d calculates the force control correction amount $\Delta S$ for correction of a target position $S_t$ to set the external force $f_S$ to the target force $f_{St}$ from the target force $f_{St}$, the external force $f_S$, and the movement limitation command L1. The force control correction amount $\Delta S$ refers to an amount in which the TCP should move from the position S to resolve a force deviation $\Delta f_S$ of the external force $f_S$ from the target force $f_{St}$ when the TCP is subjected to mechanical impedance. The force control correction amount calculation part 41d calculates the force control correction amount $\Delta S$ by e.g. active impedance control that realizes virtual mechanical impedance using the motors M1 to M6. For example, when the motion of the TCP is limited to the direction along the x-axis of the world coordinate system by the movement limitation command L1, other values than the x-axis component of $\Delta S$ are zero.

The position control unit 42 calculates the target position Si of the TCP in the world coordinate system. The position control unit 42 calculates the present position of the TCP without change as the target position $S_t$ when direct teaching is performed in the robot system 100. In addition, for example, the position control unit 42 may calculate the target position $S_t$ of the TCP using the control program generated by the teaching apparatus 45, the output of the sensor that detects the position of the object, or the like.

The command integration unit 43 has a feedback control part 43a and a force control correction amount addition part 43b as a logical structure. The command integration unit 43 integrates the target position St as a control command calculated by the position control unit 42 and the force control correction amount $\Delta S$ as a control command calculated by the force control unit 41. The command integration unit 43 outputs an operation amount to the robot 1 for achievement of a target value according to the integrated control command.

The force control correction amount addition part 43b adds the force control correction amount $\Delta S$ to the target position St. The force control correction amount addition part 43b calculates a commanded position $S_{tt}$ applied to the motors M1 to M6 of the manipulator 10. The commanded position $S_{tt}$ refers to a final target value of the TCP in the world coordinate system. The first conversion unit U1 converts the commanded position $S_{tt}$ in the world coordinate system into target angles Di as target values of the respective rotation angles of the motors M1 to M6.

The feedback control part 43a performs feedback control to control to the target angles $D_t$ using real rotation angles $D_a$ of the motors M1 to M6 as control amounts. The feedback control part 43a acquires the rotation angles $D_a$ from output of the encoders E1 to E6. The feedback control part 43a calculates operation amounts $D_e$ from the control amounts $D_a$ and the target angles $D_t$ to control the motors M1 to M6.

Figure 9:
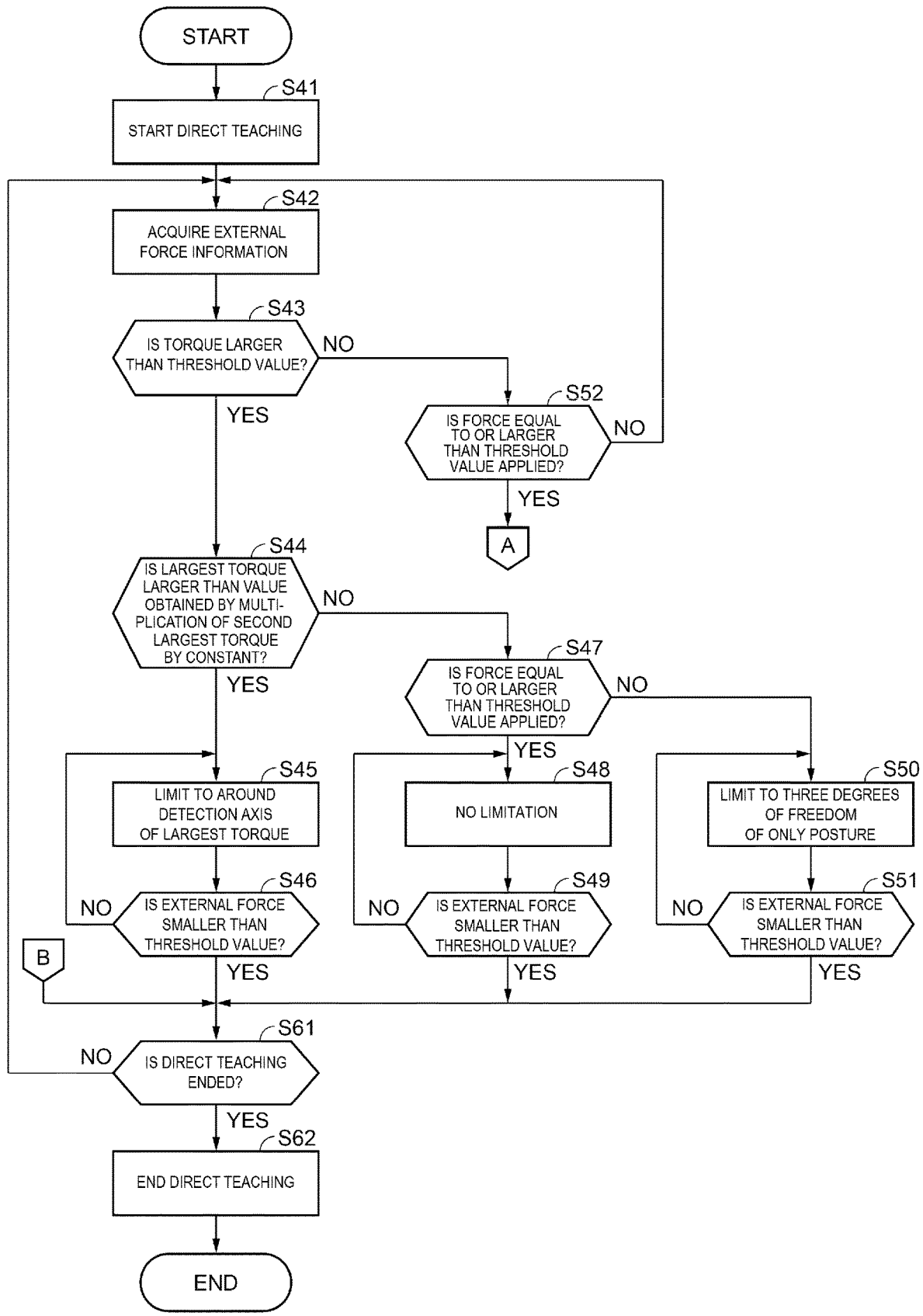
FIG. 9 is a flowchart for determination of a movement limitation direction.
Figure 10:
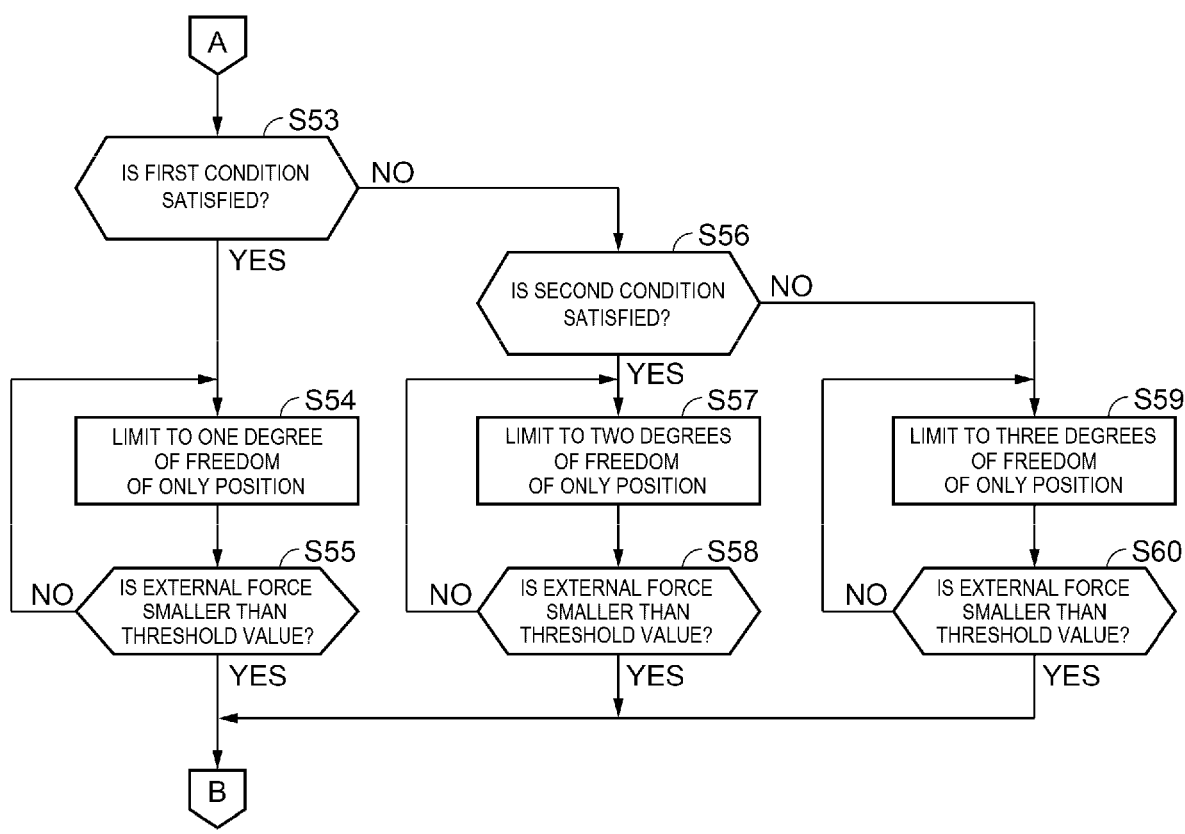
FIG. 10 is a flowchart for determination of the movement limitation direction.

Referring to flowcharts in FIGS. 9 and 10, an example of processing of the control apparatus 40 will be explained as a control method for the robot 1 in the robot system 100.

First, at step S41, for example, a command to start direct teaching is input from the teaching apparatus 45, and the control apparatus 40 moves to a direct teaching mode and starts direct teaching. The command to start direct teaching may be input to the control apparatus 40 from another than the teaching apparatus 45. The command to start direct teaching may be input to the control apparatus 40, for example, when a switch attached to the robot 1 is pressed.

At step S42, the movement limitation determination part 41c acquires the external force $f_S$ and torque of the external force $f_S$ detected by the force detection part 41b as external force information. That is, the external force information includes the forces along the three detection axes and the torque around the three detection axes of the force detection part 41b.

At step S43, the movement limitation determination part 41c determines whether or not magnitude of the torque of the external force $f_S$ acquired at step S42 is larger than a predetermined threshold value. When the magnitude of the torque is larger than the threshold value, the movement limitation determination part 41c moves processing to step S44 and, when the magnitude of the torque is equal to or smaller than the threshold value, moves processing to step S52.

At step S44, the movement limitation determination part 41c determines whether or not the largest value of the magnitude of the torque of the respective components of the external force $f_S$ acquired at step S42 is larger than a value obtained by multiplication of the second largest value by a constant. When the maximum value is larger than the value obtained by multiplication by the constant, the movement limitation determination part 41c moves the processing to step S45 and, when the maximum value is equal to or smaller than the value obtained by multiplication by the constant, moves the processing to step S47.

At step S45, the movement limitation determination part 41c generates the movement limitation command L1 to limit the motion of the TCP around the detection axis having the maximum value of the magnitude of the torque of the respective components of the external force $f_S$ acquired at step S42 and outputs the command to the force control correction amount calculation part 41d. For example, when the torque around the x-axis of the respective torque of the external force $f_S$ is larger than a value obtained by multiplication of the second largest torque by a constant, the movement limitation determination part 41c limits the motion of the TCP to one degree of freedom only around the x-axis.

At step S46, the movement limitation determination part 41c determines whether or not the external force $f_S$ detected in the force detection part 41b is smaller than a predetermined threshold value. When the external force $f_S$ is smaller than the threshold value, the movement limitation determination part 41c determines that the external force $f_S$ acting on the robot 1 is reduced and stops output of the movement limitation command L1 generated at step S45, and moves the processing to step S61. When the external force $f_S$ is equal to or larger than the threshold value, the movement limitation determination part 41c repeats the processing at step S45.

At step S47, the movement limitation determination part 41c determines whether or not the external force $f_S$ acquired at step S42 is equal to or larger than a predetermined threshold value. When the external force $f_S$ is equal to or larger than the threshold value, the movement limitation determination part 41c moves the processing to step S48 and, when the external force $f_S$ is smaller than the threshold value, moves the processing to step S50.

At step S48, the movement limitation determination part 41c generates the movement limitation command L1 to allow motion of the TCP at six degrees of freedom and outputs the command to the force control correction amount calculation part 41d. That is, in this case, the movement limitation determination part 41c does not limit the motion of the TCP according to the external force $f_S$.

At step S49, the movement limitation determination part 41c determines whether or not the external force $f_S$ detected in the force detection part 41b is smaller than a predetermined threshold value. When the external force $f_S$ is smaller than the threshold value, the movement limitation determination part 41c determines that the external force $f_S$ acting on the robot 1 is reduced and stops output of the movement limitation command L1 generated at step S48, and moves the processing to step S61. When the external force $f_S$ is equal to or larger than the threshold value, the movement limitation determination part 41c repeats the processing at step S48.

At step S50, the movement limitation determination part 41c generates the movement limitation command L1 to limit the motion of the TCP at three degrees of freedom of only the posture and outputs the command to the force control correction amount calculation part 41d. That is, the movement limitation determination part 41c allows the motion of the TCP to change the posture around the three detection axes and disallows motion to change the position along the three detection axes.

At step S51, the movement limitation determination part 41c determines whether or not the external force $f_S$ detected in the force detection part 41b is smaller than a predetermined threshold value. When the external force $f_S$ is smaller than the threshold value, the movement limitation determination part 41c determines that the external force $f_S$ acting on the robot 1 is reduced and stops output of the movement limitation command L1 generated at step S50, and moves the processing to step S61. When the external force $f_S$ is equal to or larger than the threshold value, the movement limitation determination part 41c repeats the processing at step S50.

At step S52, the movement limitation determination part 41c determines whether or not the external force $f_S$ acquired at step S42 is equal to or larger than a predetermined threshold value. When the external force $f_S$ is equal to or larger than the threshold value, the movement limitation determination part 41c moves the processing to step S53 and, when the external force $f_S$ is smaller than the threshold value, returns the processing to step S42.

At step S53, the movement limitation determination part 41c determines whether or not the external force $f_S$ acquired at step S42 satisfies the first condition. When the external force $f_S$ satisfies the first condition, the movement limitation determination part 41c moves the processing to step S54 and, when the external force $f_S$ does not satisfy the first condition, moves the processing to step S56. The first condition is a condition for determination as to whether or not the motion of the TCP according to the external force $f_S$ is limited to one degree of freedom.

At step S54, the movement limitation determination part 41c generates the movement limitation command L1 to limit the motion of the TCP according to the external force $f_S$ to one degree of freedom around the detection axis having the largest component of the external force $f_S$ and outputs the command to the force control correction amount calculation part 41d. When the external force $f_S$ is a force in the x-axis direction, the movement limitation determination part 41c generates the movement limitation command L1 to limit the motion of the TCP to one degree of freedom in the x-axis direction.

At step S55, the movement limitation determination part 41c determines whether or not the external force $f_S$ detected in the force detection part 41b is smaller than a predetermined threshold value. When the external force $f_S$ is smaller than the threshold value, the movement limitation determination part 41c determines that the external force $f_S$ acting on the robot 1 is reduced and stops output of the movement limitation command L1 generated at step S54, and moves the processing to step S61. When the external force $f_S$ is equal to or larger than the threshold value, the movement limitation determination part 41c repeats the processing at step S54.

At step S56, the movement limitation determination part 41c determines whether or not the external force $f_S$ acquired at step S42 satisfies the second condition. When the external force $f_S$ satisfies the second condition, the movement limitation determination part 41c moves the processing to step S57 and, when the external force $f_S$ does not satisfy the second condition, moves the processing to step S59. The second condition is a condition for determination as to whether or not the motion of the TCP according to the external force $f_S$ is limited to two degrees of freedom.

At step S57, the movement limitation determination part 41c generates the movement limitation command L1 to limit the motion of the TCP according to the external force $f_S$ to two degrees of freedom along a plane defined by the detection axis having the largest component of the external force $f_S$ and the detection axis having the second largest component of the external force $f_S$ and outputs the command to the force control correction amount calculation part 41d. When the external force $f_S$ is a force along the x-y plane, the movement limitation determination part 41c generates the movement limitation command L1 to limit the motion of the TCP to two degrees of freedom along the x-y plane.

At step S58, the movement limitation determination part 41c determines whether or not the external force $f_S$ detected in the force detection part 41b is smaller than a predetermined threshold value. When the external force $f_S$ is smaller than the threshold value, the movement limitation determination part 41c determines that the external force $f_S$ acting on the robot 1 is reduced and stops output of the movement limitation command L1 generated at step S57, and moves the processing to step S61. When the external force $f_S$ is equal to or larger than the threshold value, the movement limitation determination part 41c repeats the processing at step S57.

At step S59, the movement limitation determination part 41c generates the movement limitation command L1 to limit the motion of the TCP to three degrees of freedom of only the position and outputs the command to the force control correction amount calculation part 41d. That is, the movement limitation determination part 41c allows the motion of the TCP to change the position along the three detection axes and disallows motion to change the posture around the three detection axes.

At step S60, the movement limitation determination part 41c determines whether or not the external force $f_S$ detected in the force detection part 41b is smaller than a predetermined threshold value. When the external force $f_S$ is smaller than the threshold value, the movement limitation determination part 41c determines that the external force $f_S$ acting on the robot 1 is reduced and stops output of the movement limitation command L1 generated at step S59, and moves the processing to step S61. When the external force $f_S$ is equal to or larger than the threshold value, the movement limitation determination part 41c repeats the processing at step S59.

At step S61, the movement limitation determination part 41c determines whether or not the direct teaching is ended according to e.g. an operation by the worker on the teaching apparatus 45. When the direct teaching is ended, the movement limitation determination part 41c moves the processing to step S62 and, when the direct teaching is not ended, returns the processing to step S42. At the time, the output of the movement limitation command L1 is stopped and the TCP is not moving. That is, only the position control on the TCP is executed by the control apparatus 40.

At step S62, for example, a command to end the direct teaching is input from the teaching apparatus 45, the control apparatus 40 ends the direct teaching mode and the direct teaching is ended. Note that the plurality of constants used for the series of processing shown in FIGS. 9 and 10 may be arbitrarily set. Therefore, the constants may be set to the same value as one another or set to different values from one another. The same applies to the plurality of threshold values.

As described above, according to the robot system 100, when the worker performs direct teaching, the movement limitation command L1 is automatically generated by the movement limitation determination part 41c based on the external force $f_S$ acting on the end effector 20. Thereby, for example, an operation by the worker of setting the limitation of the motion of the TCP using the teaching apparatus 45 is unnecessary and the time required for direct teaching is shortened. In direct teaching of related art, for example, a program for moving the TCP with limitation on the x-y plane and subsequently moving the TCP along the x-axis is not generated unless the degree of freedom to be limited is selected by the worker using a GUI of the teaching apparatus or the like. On the other hand, according to the robot system 100, the external force $f_S$ applied to the end effector 20 is changed, and thereby, the degree of freedom of the motion of the TCP is automatically limited. As described above, according to the robot system 100, work in the direct teaching may be simplified.

The embodiment is described as above, but the present disclosure is not limited to these disclosures. The configurations of the respective parts may be replaced by arbitrary configurations having the same functions, and arbitrary configurations in the respective embodiments may be omitted or added within the technical scope of the present disclosure. From these disclosures, various alternative embodiments would be clear to a person skilled in the art.

For example, the robot 1 is not limited to the robot including the single manipulator 10 as the six-axis arm. The numbers of manipulators and end effectors of the robot 1, the degree of freedom of the manipulator, etc. may be arbitrarily changed. For example, the robot 1 may be a Cartesian robot, a horizontal articulated robot, a vertical articulated robot, a dual-arm robot, or the like. Similarly, the position of the force detector 30 is not limited to the distal end of the manipulator 10.

Figure 11:
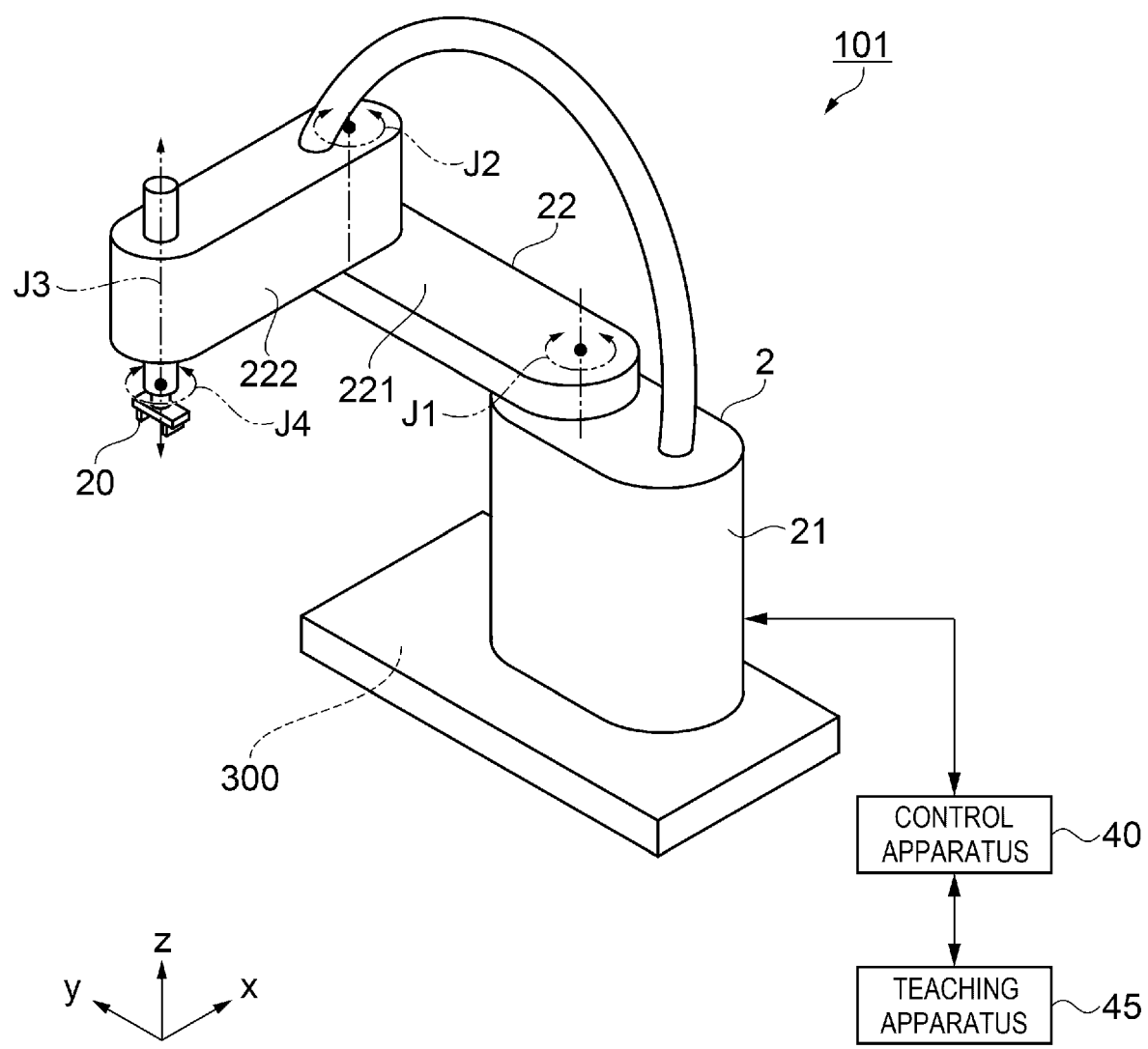
FIG. 11 is a perspective view for explanation of a schematic configuration of another embodiment of the robot system.

For example, as shown in FIG. 11, a robot system 101 according to another embodiment includes a robot 2, the control apparatus 40, and the teaching apparatus 45. The robot 2 is a horizontal articulated robot including a base 21, a manipulator 22, the end effector 20, and a force detector 300. In the example shown in FIG. 11, the force detector 300 has e.g. a rectangular parallelepiped shape and is attached to a lower part of the base 21.

The manipulator 22 is an arm having a first link 221 and a second link 222. The manipulator 22 includes four joints J1 to J4 respectively having axes along the z-axis of the world coordinate system. The three joints J1, J2, J4 are rotary joints and the joint J3 is a translatory joint. That is, a TCP corresponding to the distal end of the manipulator 22 has four degrees of freedom. The robot 2 may further include a force detector that detects an external force $f_S$ acting on the manipulator 22 on the distal end of the manipulator 22 like the force detector 30 of the robot 1. The configuration of the functional block of the robot system 101 is substantially the same as a configuration obtained by removal of the joints J5, J6 from the block diagram in FIG. 4, and the overlapping explanation will be omitted.

Figure 12:
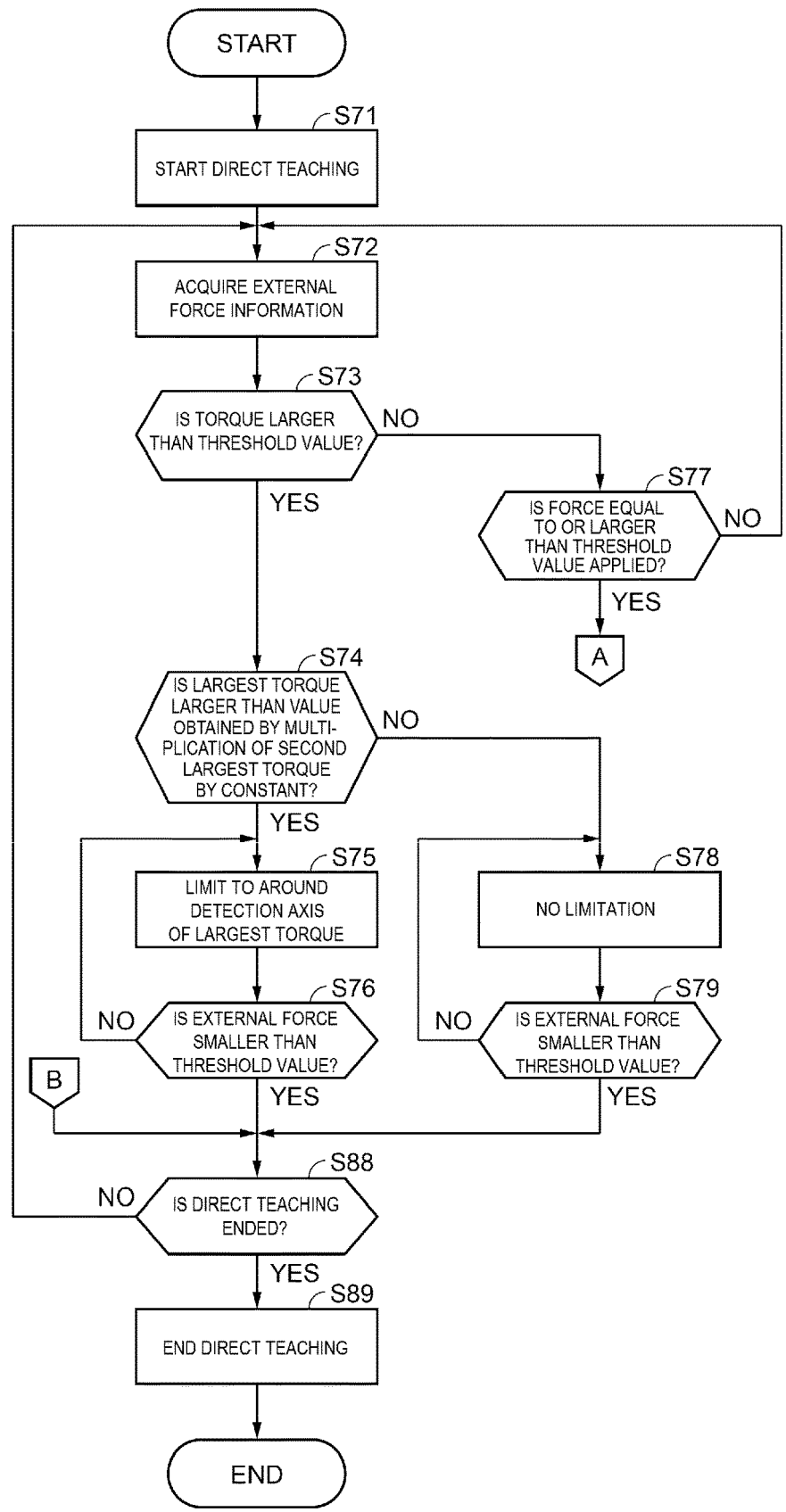
FIG. 12 is a flowchart for determination of the movement limitation direction in the other embodiment.
Figure 13:
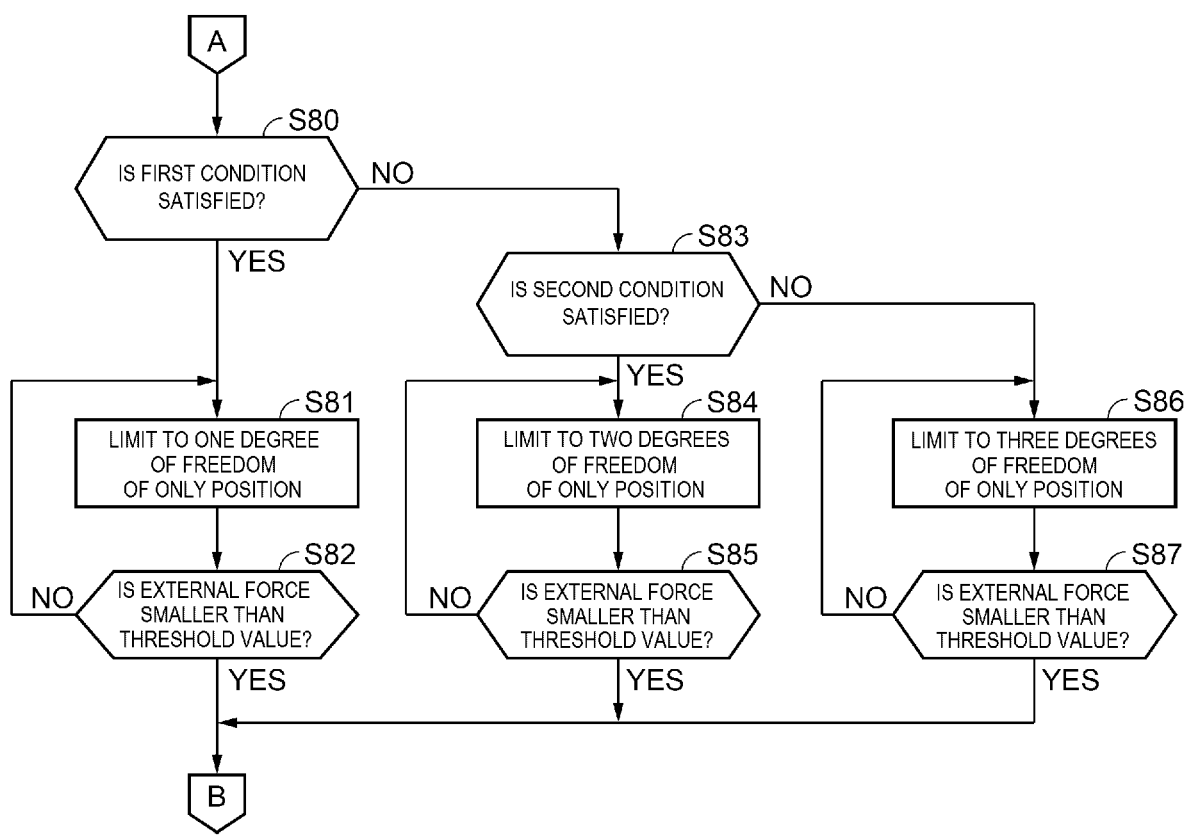
FIG. 13 is a flowchart for determination of the movement limitation direction in the other embodiment.

Using the flowcharts in FIGS. 12 and 13, an example of processing of the control apparatus 40 will be explained as a control method for the robot 2 in the robot system 101. Note that steps S71 to S76, S77, S78, S79, S80 to S89 in the flowcharts in FIGS. 12 and 13 correspond to steps S41 to S46, S52, S48, S49, S53 to S62 in the flowcharts in FIGS. 9 and 10, respectively. That is, the flowcharts in FIGS. 12 and 13 are formed by removal of the steps S47, S50, S51 from the flowcharts in FIGS. 9 and 10. Accordingly, the detailed explanation of the respective steps in the flowcharts in FIGS. 12 and 13 will be omitted.

For example, at step S74, the movement limitation determination part 41c determines whether or not the largest value of the magnitude of the torque of the respective components of the external force $f_S$ acquired at step S72 is larger than a value obtained by multiplication of the second largest value by a constant. It is considered that the torque of the external force $f_S$ acting on the TCP is mainly torque around the z-axis in the world coordinate system. Accordingly, the movement limitation command L1 generated at step S75 is a command to limit the TCP to one degree of freedom around the z-axis. On the other hand, at step S78, the movement limitation determination part 41c allows the motion of the TCP at the four degrees of freedom and does not limit the motion of the TCP according to the external force $f_S$.

When the robot 2 has only the force detector 300 as the force sensor, detection of the torque of the external force $f_S$ is difficult, and the processing at steps S80 to S87 in FIG. 13 may be mainly executed. A first condition and a second condition at the steps S80 and S83 are the same as those of the above described embodiment. For example, in the robot system 101, when the worker applies an external force $f_S$ along the x-axis of the world coordinate system to the end effector 20, the motion of the TCP is limited to one degree of freedom along the x-axis of the world coordinate system. That is, the TCP translationally moves along the x-axis in the world coordinate system according to the external force $f_S$.

Obviously, the present disclosure includes other various embodiments not described above such as configurations obtained by mutual application of the above described respective configurations to one another. The technical scope of the present disclosure is defined only by the matters specifying the invention that relates to claims appropriate from the above description.

What is claimed is:

1. A control method for a robot including a manipulator and a force detector that detects an external force acting on the manipulator on three detection axes orthogonal to one another, comprising:
    detecting a direction of the external force by the force detector; and
    limiting motion of a tool center point set for the manipulator according to the external force to one degree of freedom based on the direction of the external force by controlling the external force acting on the tool center point to be a predetermined target force, when the largest value of the magnitude of the respective components of the external force on the three detection axes of the force detector is larger than a product of the second largest value and a first constant.

2. A robot system comprising:
    a robot including a manipulator and a force detector that detects an external force acting on the manipulator on three detection axes orthogonal to one another; and
    a processor programmed to detect a direction of the external force by the force detector, and limits motion of a tool center point set for the manipulator according to the external force to one degree of freedom based on the direction of the external force by controlling the external force acting on the tool center point to be a predetermined target force, when the largest value of the magnitude of the respective components of the external force on the three detection axes of the force detector is larger than a product of the second largest value and a first constant.

3. The control method for the robot according to claim 1, further comprising:
    limiting motion of the tool center point set according to the external force to two degrees of freedom when the largest value of the magnitude of the respective components of the external force on the three detection axes of the force detector is smaller than a product of the second largest value and a second constant and the second largest value is larger than a product of the smallest value and a third constant.

* * * * *